US009147181B2

United States Patent
DeLuca et al.

(10) Patent No.: US 9,147,181 B2
(45) Date of Patent: Sep. 29, 2015

(54) PRE-TRANSMISSION CONTEXTUAL ELECTRONIC MESSAGE PROMPTING

(75) Inventors: Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 13/313,540

(22) Filed: Dec. 7, 2011

(65) Prior Publication Data

US 2013/0151629 A1 Jun. 13, 2013

(51) Int. Cl.
*G06F 15/16* (2006.01)
*G06Q 10/10* (2012.01)
*H04L 12/24* (2006.01)

(52) U.S. Cl.
CPC ............ *G06Q 10/107* (2013.01); *H04L 41/026* (2013.01)

(58) Field of Classification Search
CPC ..... G06Q 10/107; H04L 12/585; H04L 12/58
USPC ........................................................ 709/206
See application file for complete search history.

(56) References Cited

U.S. PATENT DOCUMENTS

| 2004/0205134 A1 | 10/2004 | Digate et al. | |
| 2006/0085515 A1* | 4/2006 | Kurtz et al. | 709/207 |
| 2007/0130276 A1* | 6/2007 | Zhang et al. | 709/207 |
| 2009/0055497 A1 | 2/2009 | Dickerson et al. | |
| 2010/0070554 A1 | 3/2010 | Richardson et al. | |
| 2011/0055334 A1* | 3/2011 | Tivyan | 709/206 |

OTHER PUBLICATIONS

"Correlation and suggestion of recipient-list based on subject and content keywords," IP.com Prior Art Database, IP.com No. IPCOM000206433D, Electronic publication date: Apr. 26, 2011, disclosed anonymously.

* cited by examiner

*Primary Examiner* — Chris Parry
*Assistant Examiner* — Alan S Chou
(74) *Attorney, Agent, or Firm* — Noah A. Sharkan; Matthew Chung (57) ABSTRACT

Embodiments of the present invention provide a system, method, and program product to provide to a user creating an electronic message one or more informational messages related to the content and addressees of the electronic message. A computer system identifies one or more addressees of the electronic message created by the user. The computer system identifies any informational messages associated with each of the addressees, and displays to the user the identified informational messages. Each step is performed prior to the computer system transmitting the electronic message for delivery to any addressee. The informational messages can be predefined by the addressees of the electronic message and include hyperlinks and other programmable elements for execution by the user. The electronic message can be an e-mail, instant message, or other form of electronic message.

12 Claims, 5 Drawing Sheets

PRE-TRANSMISSION CONTEXTUAL ELECTRONIC MESSAGE PROMPTING

FIELD OF THE INVENTION

The present invention relates generally to informational prompts in a messaging system, and more particularly to contextual prompting of a message-sending user based on the content and addressees of the message, prior to transmission of the message to any addressees.

BACKGROUND

Electronic messaging has been widely adopted for business-related communications. Electronic messaging technologies such as e-mail and instant messaging can enable an organization to operate globally, while remaining cohesive and coordinated. In the context of a large organization, internal electronic messaging can be a powerful tool for the rapid exchange of information among many employees and can help employees identify and access each other's expertise as well as other sources of information.

Typically, however, as the size of an organization grows, so does the complexity of the business relationships within and external to the organization. Employees' expertise, collaborations, business and research projects, and various other business functions are often constantly evolving. Consequently, electronic communications within an organization that pertain to particular subject matter may not be consistently directed to the appropriate recipients, which can result in wasted time and resources.

One such scenario involves an individual who begins work in a new job function. Colleagues may continue to send the individual messages pertaining to his or her prior job function, leaving the individual to inform them of his or her new job function and perhaps suggest an appropriate recipient of the messages or an alternative resource for the information sought. This exchange can place a considerable burden on the individual, especially if multiple colleagues make the same mistake. These miscommunications can also delay access to the appropriate individual or information originally sought.

Existing approaches to this and similar problems focus primarily on routing or rerouting an electronic message to an appropriate recipient. For example, a messaging system may correlate previously sent messages with their recipients to create delivery rules for future messages containing similar content, or a messaging system may automatically route a message to a particular recipient based on the recipient's expertise in the subject matter of the message. Such approaches may help avoid delivering messages to inappropriate recipients, but they are not well-suited for informing a message-sender of the recipients' preferences or suggestions, and they may still be subject to inaccuracies inherent in the systems' determinations of which individuals should receive the message. Further, when messaging systems route or reroute an electronic message after it has been transmitted by the message-sender, the message-sender may lose the ability to modify the message, learn that the original addressee is not the appropriate contact, choose an alternative addressee, or otherwise reconsider how to approach the issue at hand.

An efficient way to provide customizable information to a message-sender related to the content and addressees of an electronic message, prior to transmission of the message to any addressees, would be useful.

Accordingly, there exists a need in the art to overcome the deficiencies and limitations described hereinabove.

SUMMARY

Embodiments of the present invention provide a system, method, and program product to provide to a user creating an electronic message one or more informational messages related to the content and addressees of the electronic message. A computer system identifies one or more addressees of the electronic message created by the user. The computer system identifies any informational messages associated with each of the addressees, and displays to the user the identified informational messages. Each step is performed prior to the computer system transmitting the electronic message for delivery to any addressees.

In certain embodiments of the present invention, the computer system identifies the informational messages associated with each addressee by retrieving the informational messages from a database, wherein each informational message is associated with an addressee and one or more text strings. The computer system can analyze the contents of the electronic message and determine whether it contains one or more of the text strings. The computer system can display the identified informational messages to the user and can visually distinguish the one or more portions of the electronic message that are determined to match the text strings from the remainder of the electronic message.

In certain embodiments of the present invention, the informational messages can be predefined by the addressees of the electronic message, and can include hyperlinks and other programmable elements for execution by the user. The electronic message can be, but is not limited to, an e-mail, instant message, cellular network text message, social media message, or blog post.

DETAILED DESCRIPTION

In brief summary, a preferred embodiment of the present invention is practiced in the context of a graphical e-mail messaging client running on a computing device, where the present invention is integrated with an existing e-mail messaging system and client. A user creates a message, including naming addressees and entering text into the body of the message. As the user composes the electronic message or upon clicking a "Send" button or a "View Message Preferences" button, the computing device determines whether the addressees have predefined informational messages for display to users who address a message to them which contains the particular subject matter of the user's message.

If the computing device determines that no such informational messages are applicable, the computing device transmits the message for delivery to the addressees. If the computing device determines that one or more of the addressees' predefined informational messages are applicable, the computing device displays those informational messages to the user. For example, an individual may have ceased work on a project and no longer wishes to receive e-mail messages related to that project. The individual may create a predefined informational message to inform others that issues pertaining to that project should now be logged and forwarded to another contact. Later, when a user creates a message that is addressed to the individual and mentions the project, the user is prompted with the predefined informational messages regarding the new logging procedure and alternative contact, prior to the message being transmitted to the individual, and can decide how best to proceed.

Embodiments of the present invention will now be described in detail with reference to the accompanying drawings.

Figure 1:
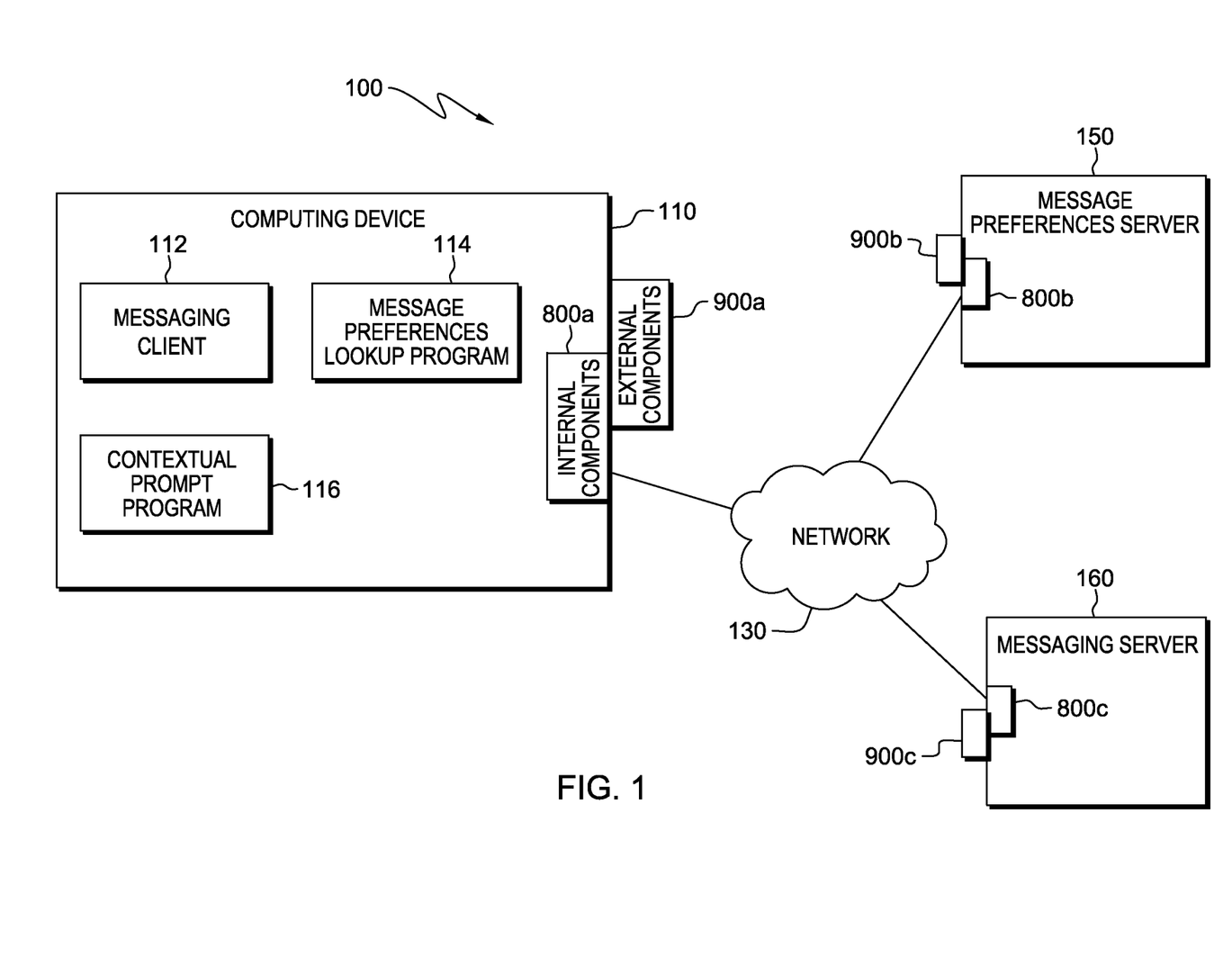
FIG. 1 is a functional block diagram of an addressee-based contextual message prompting system 100 in accordance with an embodiment of the present invention.

FIG. 1 is a functional block diagram illustrating an addressee-based contextual message prompting system 100 in accordance with an embodiment of the present invention. Addressee-based contextual message prompting system 100 includes a computing device 110, a message preferences server 150, and a messaging server 160, all interconnected over a network 130.

Computing device 110 includes a messaging client 112, a message preferences lookup program 114, and a contextual prompt program 116, which receive text input from a message-creating user, compare the text input with data retrieved from message preferences server 150 via network 130, identify and display applicable informational messages to the user, and transmit electronic messages to messaging server 160 via network 130 for delivery to recipients. Computing device 110, message preferences server 150, and messaging server 160 include internal components 800 and external components 900. Computing device 110, message preferences server 150, and messaging server 160 can be laptop computers, desktop computers, specialized computer servers, or any other computer systems known in the art. In general, computing device 110, message preferences server 150, and messaging server 160 can be any programmable electronic devices as described in further detail with regard to FIG. 5. In another embodiment, computing device 110 represents a computer system utilizing clustered computers and components to act as a single pool of seamless resources when accessed through a network. For example, this implementation may be preferred for data centers and for cloud computing applications. Further, it should be understood that, for the purpose of illustration, FIG. 1 does not show other computer systems and elements which may be present when using an embodiment of the present invention, such as, for example, additional computer systems in communication with messaging server 160 used by message recipients to receive messages.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computing device 110, message preferences server 150, and messaging server 160 in accordance with a desired embodiment of the invention.

Message preferences server 150 includes a database containing predefined informational messages which, upon receiving a request from computing device 110, message preferences server 150 outputs to computing device 110 via network 130. Messaging server 160 receives the outputted electronic messages of computing device 110 via network 130 and delivers them to one or more recipients. In a preferred embodiment, messaging server 160 is an existing messaging system into which the remainder of the present invention is integrated. In a preferred embodiment, computing device 110 is in communication with a plurality of messaging servers 160 to enable addressee-based contextual message prompting system 100 to simultaneously support a plurality of electronic messaging technologies, such as, for example, e-mail, instant messaging, cellular network text messaging, blog posting, and social media messaging.

Figure 2:
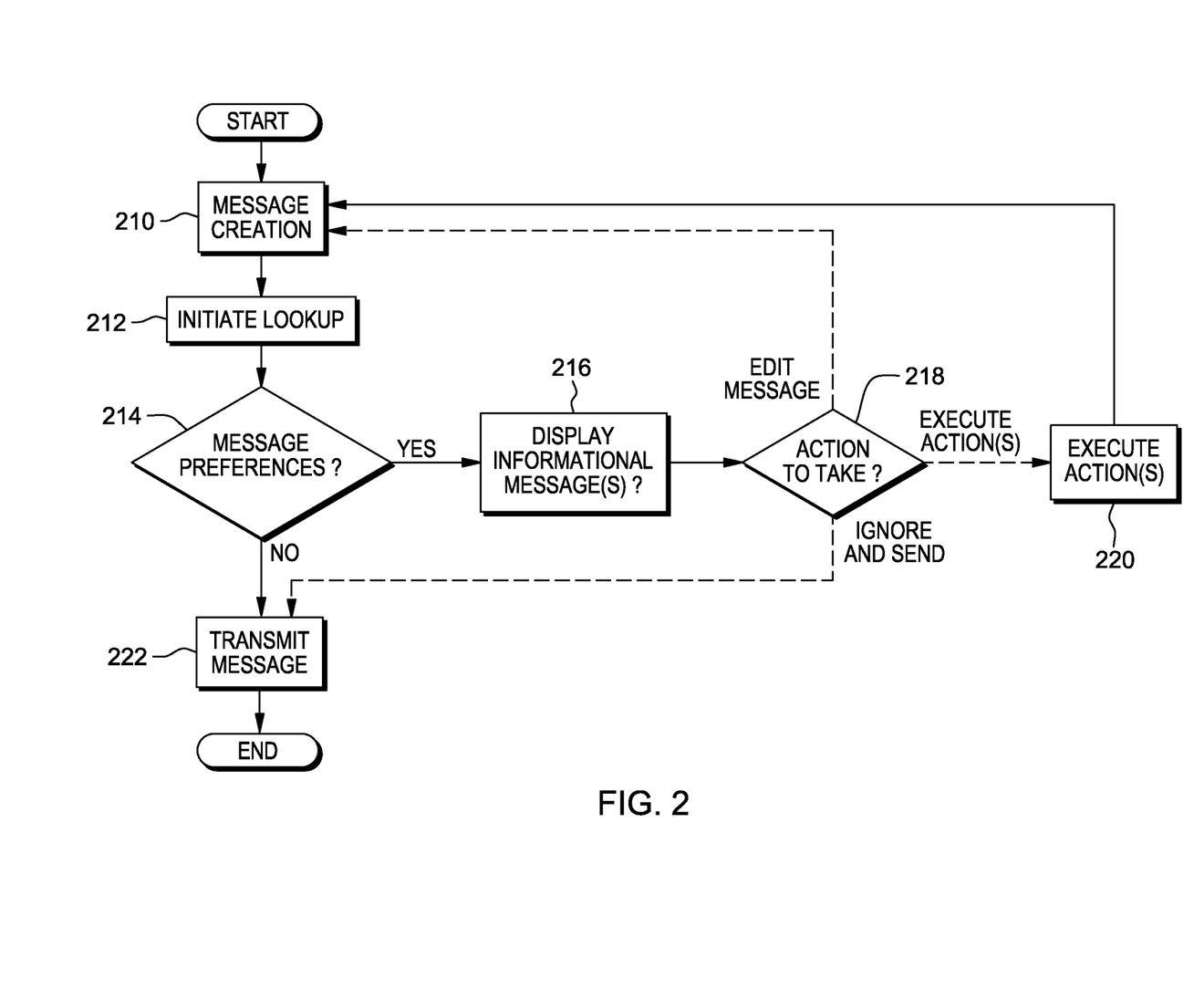
FIG. 2 is a flowchart illustrating the basic operational steps for an embodiment of the present invention.

FIG. 2 is a flowchart illustrating the basic operational steps of an addressee-based contextual message prompting system 100 in accordance with an embodiment of the present invention. In step 210, messaging client 112 receives text inputted by a user creating an electronic message, including one or more addressees and other content of the electronic message. Typically, messaging client 112 is one or more software computer programs which are capable of being integrated with the remainder of addressee-based contextual message prompting system 100, and which allow a user to create and view an electronic message, and transmit the electronic message to a messaging server 160. In a preferred embodiment, the user enters text and any other content into a message form generated by messaging client 112, such as, for example, an e-mail message form containing "To:", "Cc:", "Bcc:", "Subject:", and message body fields. In a preferred embodiment, the e-mail message form includes, among others, a "Send" button and a "View Message Preferences" button, which the user may select. Embodiments of the present invention can also include multiple separate or integrated messaging clients 112, and can support a plurality of electronic messaging technologies, such as, for example, e-mail, instant messaging, cellular network text messaging, blog posting, and social media messaging. A preferred embodiment utilizes Lotus Notes® V8.5.3, available from International Business Machines Corporation of Armonk, N.Y., as messaging client 112.

In step 212, the user initiates lookup of any applicable informational messages, after which messaging client 112 passes the text data of the message, which includes the addressees and other contents of the message, to message preferences lookup program 114. In a preferred embodiment, step 212 involves the user selecting a "Send" button on the e-mail message form into which the user entered text in step 210. In another embodiment of the present invention, the user may also select a "View Message Preferences" button in step 212 to pass the text data to message preferences lookup program 114. In yet another embodiment, messaging client 112 can pass the text data to message preferences lookup program 114 as the user composes the electronic message to enable asynchronous lookup of the informational messages as the user composes the electronic message.

In step 214, message preferences lookup program 114 uses the text data received from messaging client 112 to determine whether, based on the addressees and subject matter of the message, any predefined informational messages should be displayed to the user before computing device 110 transmits the message to messaging server 160 for delivery to the addressees.

In a preferred embodiment, message preferences server 150 includes a database containing a plurality of informational messages created by a plurality of individuals who might receive electronic messages from a message-sending user. Each informational message is associated with one or more text strings and the name and electronic address of the individual who created it. The phrase "text strings," as used in this specification, means a finite sequence of text characters such as, for example, keywords, topic tags, identification numbers, identification codes, and phrases. The text characters can include alphanumeric characters and symbols. An individual can also associate an informational message with a particular pattern of text strings, such as, for example, requiring that two text strings be present in the same sentence. The informational messages can comprise information about suggested alternative recipients of a message, alternative resources for information, or any other information the individual wishes a message-sending user to see prior to transmitting a message containing the associated text strings to the individual. The informational messages can be permanent or include an optional time period of applicability. An individual can also include in the informational messages one or more hyperlinks or other programmable elements that the user can execute to perform actions such as, for example, automatically replacing the original addressees of a message with suggested alternative addressees, visiting a web page, or opening a particular file or directory.

In step 214, message preferences lookup program 114 retrieves from message preferences server 150 via network 130 all informational messages associated with the addressees of the user's message. Message preferences lookup program 114 then analyzes the text data received from messaging client 112 to determine whether the text data contains any of the text strings or patterns of text strings associated with each of the retrieved informational messages.

If message preferences lookup program 114 determines that the text data does not contain any of the text strings, it instructs messaging client 112 to proceed with sending the electronic message and, in step 222, messaging client 112 transmits the electronic message to messaging server 160 for delivery to the message's addressees. In another embodiment, such as an embodiment utilizing a "View Message Preferences" button, upon a determination that the text data does not contain any of the text strings, messaging client 112 may indicate this determination to the user and then permit the user to continue editing the electronic message back in step 210.

If message preferences lookup program 114 determines that the text data does contain one or more of the text strings, it passes the predefined informational messages associated with the identified text strings, including the contact information of the associated addressees, to contextual prompt program 116.

In step 216, contextual prompt program 116 displays to the user the informational messages associated with the identified text strings that were received from message preferences lookup program 114. In a preferred embodiment, contextual prompt program 116 also displays the addressee to which each informational message corresponds, and visually distinguishes for the user the portions of the electronic message that correspond to the identified text strings, such as, for example, by highlighting, underlining, italicizing, or placing those portions in a different font color. In one embodiment, contextual prompt program 116 displays all informational messages in a single prompt window, as illustrated and explained in greater detail with regard to FIG. 3. In a preferred embodiment, contextual prompt program 116 displays each informational message in a separate prompt window near each identified text string, as illustrated and explained in greater detail with regard to FIG. 4. Depending on the content of each informational message created by an addressee, the informational messages displayed to the user may contain a suggested recipient, an alternative source of information, and programmable elements that the user can execute to automatically perform actions suggested by the addressee.

In step 218, contextual prompt program 116 receives from the user instructions on how to proceed in response to the displayed informational messages. In a preferred embodiment, the user may decide to edit the electronic message, execute a programmable element an addressee included in the informational message to perform an action suggested by the addressee, or ignore the informational messages and proceed with sending the electronic message in its current form and to the original addressees. If the user decides to edit the electronic message, contextual prompt program 116 hides the displayed informational message and permits the user to continue editing the electronic message with messaging client 112 back at step 210. If the user decides to execute a programmable element, contextual prompt program 116 performs the action in step 220 and then permits the user to continue editing the electronic message with messaging client 112 back at step 210. For example, a programmable element included by an addressee may be a command button or hyperlink that, when executed, automatically replaces the original addressee with an alternative addressee, automatically replaces all occurrences of an original addressee's name within the electronic message with the name of an alternative addressee, or opens a file or directory. If the user decides to ignore the informational messages and proceed with sending the electronic message in its current form and to the original addressees, contextual prompt program 116 instructs messaging client 112 to proceed with sending the electronic message and, in step 222, messaging client 112 transmits the electronic message to messaging server 160 for delivery to the message's addressees.

Operational steps 210 through 222 are illustrative of one or more embodiments of the present invention. It should be understood that the content of each step, as well as the order of operation, can be modified without departing from the spirit and intended scope of the present invention.

Figure 3:
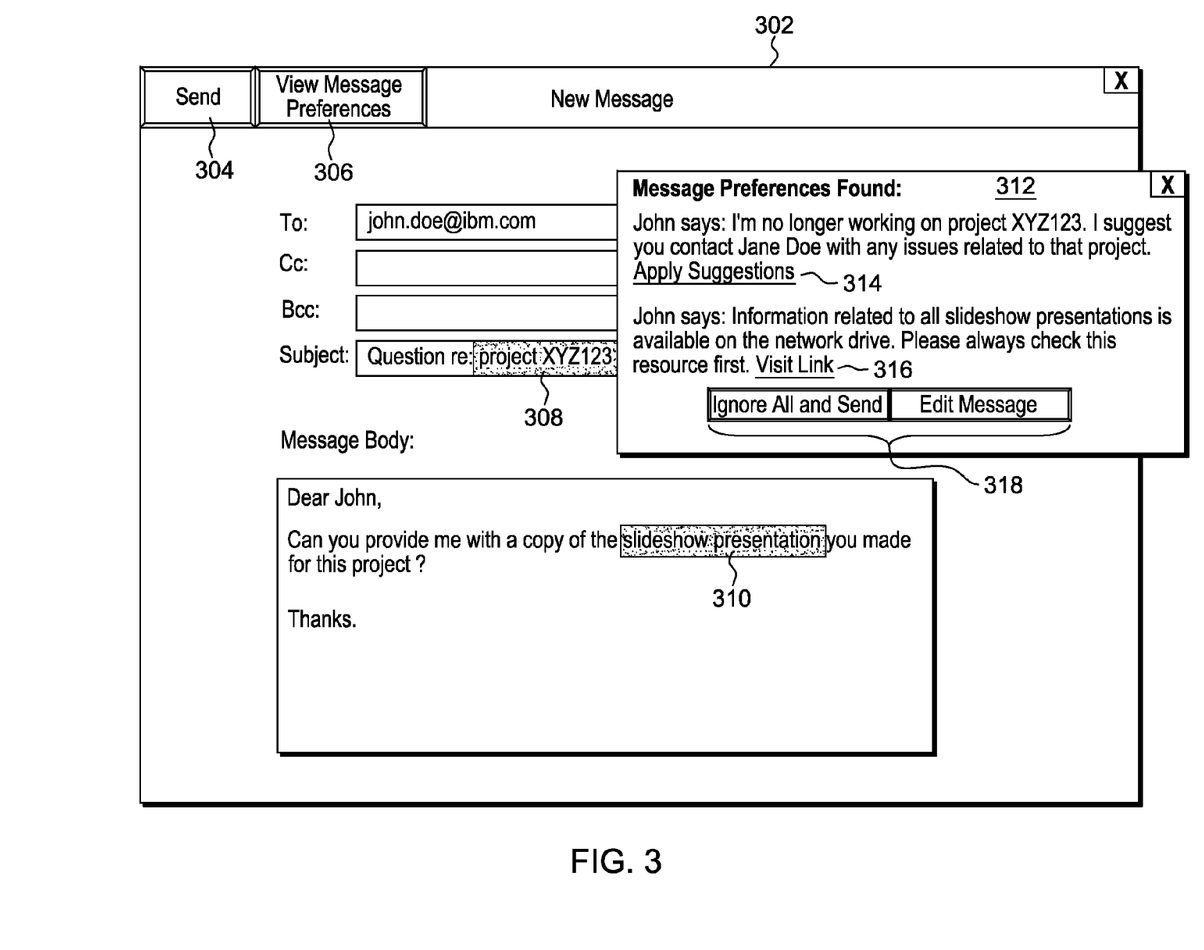
FIGS. 3 and 4 show basic illustrations of user interfaces for creating an electronic message and receiving informational messages with an addressee-based contextual message prompting system 100 in accordance with embodiments of the present invention.

FIG. 3 shows a basic illustrative user interface being operated by a hypothetical user to create an electronic message and receive informational messages with an addressee-based contextual message prompting system 100 in accordance with an embodiment of the present invention. Shown is an e-mail message form 302 that was generated, as a blank form, by messaging client 112. E-mail message form 302 includes "Send" button 304 and "View Message Preferences" button 306, as well as multiple text input fields, such as the "To:", "Subject:", and "Message Body:" fields.

In this example, prior to the user creating the e-mail message depicted, a hypothetical addressee john.doe@ibm.com ("John Doe") created two predefined informational messages. For example, John Doe may have been receiving many unnecessary emails relating to project XYZ123, a project on which he no longer works, and may also have wished to inform his colleagues that slideshow presentation information is available on a shared network drive. In this example, John Doe also decided to include hyperlink 314 in his first informational message, and hyperlink 316 in his second informational message. Hyperlink 314, when executed, automatically replaces the text "john.doe@ibm.com" in the addressee field with the suggested contact, and replaces all occurrences of the addressee's associated name with the name of the suggested contact. Hyperlink 316, when executed, opens a user's file manager application with a file path equal to the location of a network drive directory. John Doe associated his first informational message with the text string "project XYZ123", and his second with the text string "slideshow presentation".

In the example depicted in FIG. 3, the user has now entered text into the text fields of e-mail message form 302, after which the user selected the "Send" button 304. Message preferences lookup program 114 has identified John Doe's predefined informational messages for display to the user because the user's message is addressed to "john.doe@ibm.com" and contains the text strings associated with the predefined informational messages.

In the example depicted in FIG. 3, contextual prompt program 116 visually distinguishes for the user the portions of the e-mail message that match the text strings associated with each informational message by highlighting those portions of the e-mail message, shown at 308 and 310. Contextual prompt program 116 displays for the user a single prompt window 312, which contains each of the addressee's predefined informational messages. The user may click hyperlinks 314 and 316 to perform the actions previously discussed. At the bottom of single prompt window 312 are two command buttons 318. The user may select the "Ignore All and Send" button to disregard the informational messages and proceed with sending the message to "john.doe@ibm.com" in its current form. The user may select the "Edit Message" button to hide single prompt window 312 and return to editing the e-mail message without sending it.

Had the user selected the "View Message Preferences" button 306 rather than the "Send" button 304, single prompt window 312 may include a single "Close and Edit Message" button (not shown) to enable the user to close single prompt window 312 and continue editing the e-mail message.

Figure 4:
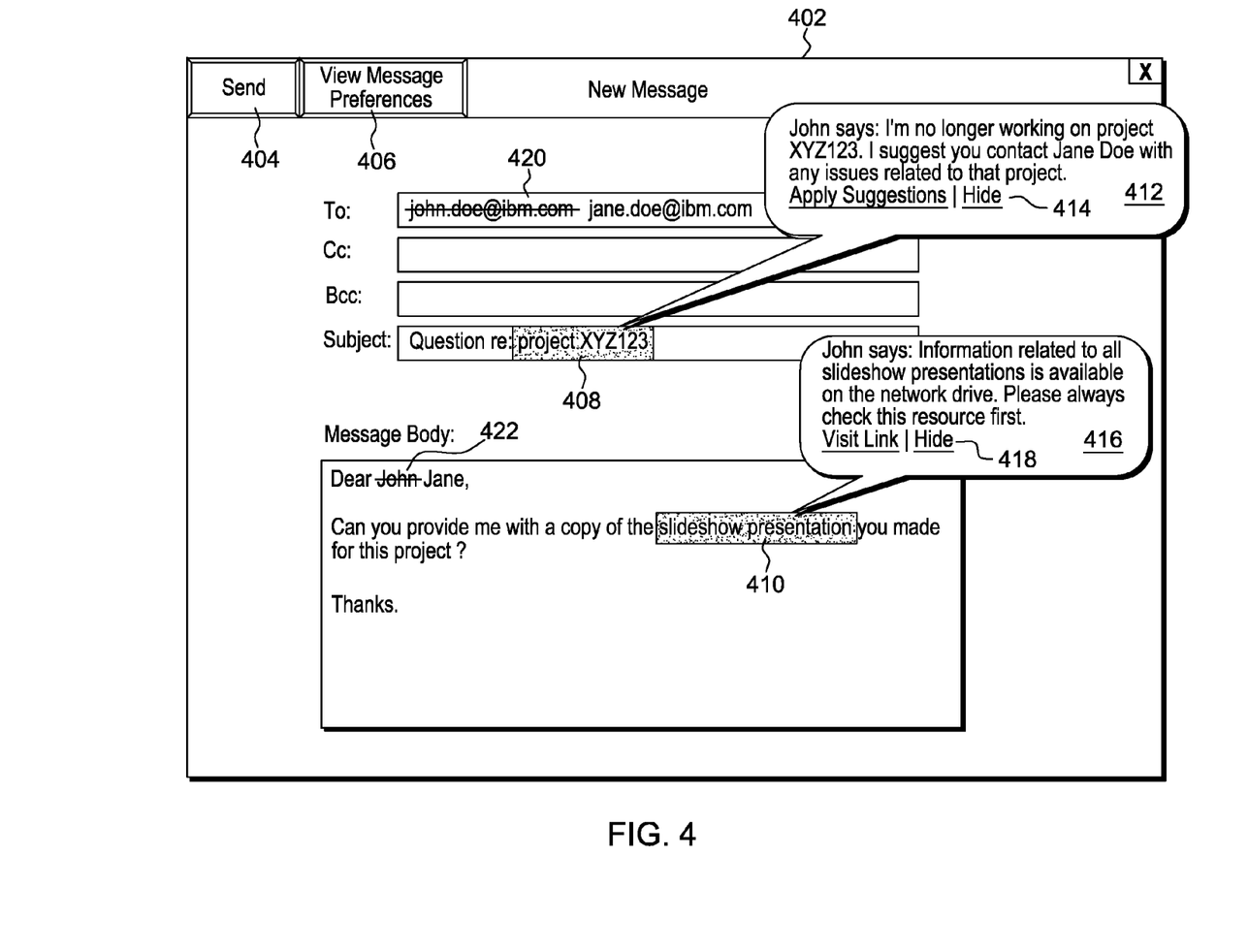

FIG. 4 shows another basic illustrative user interface being operated by a hypothetical user to create an electronic message and receive informational messages with an addressee-based contextual message prompting system 100 in accordance with an embodiment of the present invention. The illustrative user interface shown in FIG. 4 is based upon many of the same elements and the example scenario discussed with respect to FIG. 3. Accordingly, for an explanation of the example scenario and elements 402 through 410 please refer to the discussion of FIG. 3.

In the example depicted in FIG. 4, message preferences lookup program 114 was initiated as the user composed the message and it asynchronously retrieved the predefined informational messages as the user entered the text strings associated with them. Contextual prompt program 116 displays for the user multiple prompt windows 412 and 416. Each prompt window contains one of the addressee's (John Doe's) predefined informational messages and is located near the portion of the e-mail message that matched the text string associated with that particular informational message, shown at 408 and 410. Prompt windows 412 and 416 contain the same "Apply Suggestions" and "Visit Link" hyperlinks discussed with regard to FIG. 3, but also contain "Hide" hyperlinks 414 and 418 to enable the user to independently close a particular prompt window, while the other prompt window remains visible. FIG. 4 also depicts the execution of the "Apply Suggestions" hyperlink by the user. The text "john.doe@ibm.com" in the addressee field has been replaced with the suggested contact "jane.doe@ibm.com", as shown at 420. All occurrences of the addressee's associated name "John" have been replaced with the name of the suggested contact "Jane", as shown at 422. In the embodiment depicted, contextual prompt program 116 displays for the user the original addressee and associated name with a strikethrough effect to indicate to the user the changes made, as shown at 420 and 422. In other embodiments, contextual prompt program 116 may not indicate the changes or may indicate the changes with a different effect.

Figure 5:
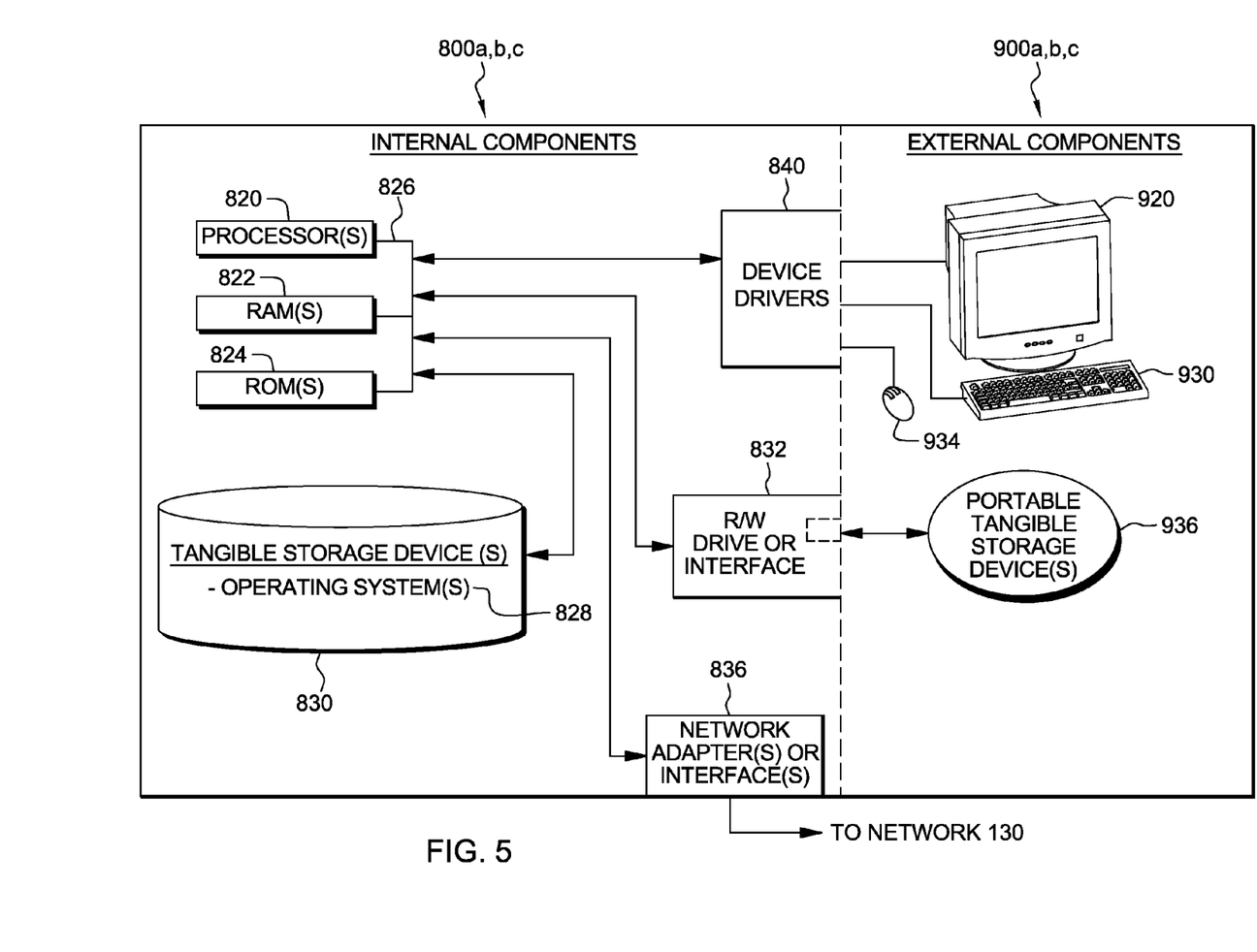
FIG. 5 is a block diagram of hardware and software within and external to the computing device and computer servers of FIG. 1 in accordance with an embodiment of the present invention.

FIG. 5 shows a block diagram of internal components 800 and external components 900 of a computer system 800, 900, such as computing device 110, message preferences server 150, and messaging server 160 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Computer system 800, 900 is representative of any electronic device capable of executing machine-readable program instructions. Computer system 800, 900 may be representative of a smart phone, a computer system, PDA, or other electronic devices. Examples of computing systems, environments, and/or configurations that may represented by computer system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing device 110, message preferences server 150, and messaging server 160 include respective sets of internal components 800a, b, c and external components 900a, b, c illustrated in FIG. 5. Each of the sets of internal components 800a, b, c includes one or more processors 820, one or more computer-readable RAMs 822 and one or more computer-readable ROMs 824 on one or more buses 826, one or more operating systems 828, and one or more computer-readable tangible storage devices 830. The one or more operating systems 828 and programs 112, 114, and 116 in computing device 110, as well as any necessary operating systems and other software in message preferences server 150 and messaging server 160, are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 112, 114, and 116 in computing device 110, as well as any necessary software in message preferences server 150 and messaging server 160 can be stored on one or more of the respective portable computer-readable tangible storage devices 936, read via the respective R/W drive or interface 832 and loaded into the respective hard drive 830.

Each set of internal components 800a, b, c also includes one or more network adapters or interfaces 836 such as a TCP/IP adapter cards, wireless Wi-Fi interface cards, or 3G or 4G wireless interface cards or other wired or wireless communication links. The programs 112, 114, and 116 in computing device 110, as well as any necessary software in message preferences server 150 and messaging server 160 can be downloaded to the respective computer systems from an external computer via a network (for example, the Internet, a local area network or other, wide area network) and respective network adapters or interfaces 836. From the one or more network adapters or interfaces 836, programs 112, 114, and 116 in computing device 110, as well as any necessary software in message preferences server 150 and messaging server 160, are loaded into the respective hard drive 830. The network may comprise copper wires, optical fibers, wireless transmission, routers, firewalls, switches, gateway computers and/or edge servers.

Each of the sets of external components 900a, b, c can include a computer display monitor 920, a keyboard 930, and a computer mouse 934. External components 900a, b, c can also include touch screens, virtual keyboards, touch pads, pointing devices, and other human interface devices. Each of the sets of internal components 800a, b, c also includes device drivers 840 to interface to computer display monitor 920, keyboard 930 and computer mouse 934. The device drivers 840, R/W drive or interface 832, and one or more network adapters or interfaces 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise forms disclosed. Many modifications and variations are possible. Such modifications and variations that may be apparent to a person skilled in the art of the invention are intended to be included within the scope of the invention as defined by the accompanying claims.

What is claimed is:

1. A method for providing to a user creating an electronic message one or more informational messages related to the content and addressees of the electronic message, the method comprising the steps of:

a computer system identifying an electronic message that has not yet been transmitted for delivery to any addressee;

the computer system identifying one or more addressees of the electronic message;

the computer system identifying any informational messages associated with each of the identified one or more addressees, wherein the informational messages are predefined by the one or more addressees and stored in a centralized database, and the informational messages comprise at least one of hyperlinks, command buttons, or programmable elements for execution by a user to replace, prior to the computer system transmitting the electronic message for delivery to any addressee, an addressee of the electronic message with an alternative addressee or replace all occurrences of an addressee's name in the electronic message with a name of an alternative addressee; and the computer system displaying the identified informational messages prior to the computer system transmitting the electronic message for delivery to any addressee;

wherein the informational messages comprise at least one of hyperlinks, command buttons, or programmable elements for execution by a user to replace, prior to the computer system transmitting the electronic message for delivery to any addressee, an addressee of the electronic message with an alternative addressee or replace all occurrences of an addressee's name in the electronic message with a name of an alternative addressee.

2. The method of claim 1, wherein the step of the computer system identifying any informational messages associated with each of the identified one or more addressees comprises the steps of:

the computer system retrieving from a database one or more informational messages associated with each of the one or more addressees, wherein the one or more informational messages are predefined by the one or more addressees, and wherein the one or more informational messages are each associated with one or more text strings; and the computer system identifying the one or more informational messages by determining that the electronic message contains the one or more text strings associated with each of the one or more informational messages.

3. The method of claim 2, wherein the step of the computer system displaying the identified informational messages further comprises visually distinguishing from the remainder of the electronic message the one or more text strings determined to be contained within the electronic message.

4. The method of claim 1, wherein the electronic message is an e-mail, instant message, cellular network text message, social media message, or blog post.

5. A computer system for providing to a user creating an electronic message one or more informational messages related to the content and addressees of the electronic message, the system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to identify an electronic message that has not yet been transmitted for delivery to any addressee;

program instructions to identify one or more addressees of the electronic message;

program instructions to identify any informational messages associated with each of the identified one or more addressees, wherein the informational messages are predefined by the one or more addressees and stored in a centralized database, and the informational messages comprise at least one of hyperlinks, command buttons, or programmable elements for execution by a user to replace, prior to the computer system transmitting the electronic message for delivery to any addressee, an addressee of the electronic message with an alternative addressee or replace all occurrences of an addressee's name in the electronic message with a name of an alternative addressee; and program instructions to display the identified informational messages prior to transmitting the electronic message for delivery to any addressee.

6. The system of claim 5, wherein the program instructions to identify any informational messages associated with each of the identified one or more addressees comprise program instructions to:

retrieve from a database one or more informational messages associated with each of the one or more addressees, wherein the one or more informational messages are predefined by the one or more addressees, and wherein the one or more informational messages are each associated with one or more text strings; and identify the one or more informational messages by determining that the electronic message contains the one or more text strings associated with each of the one or more informational messages.

7. The system of claim 6, wherein the program instructions to display the identified informational messages further comprise program instructions to:

visually distinguish from the remainder of the electronic message the one or more text strings determined to be contained within the electronic message.

8. The system of claim 5, wherein the electronic message is an e-mail, instant message, cellular network text message, social media message, or blog post.

9. A computer program product for providing to a user creating an electronic message one or more informational messages related to the content and addressees of the electronic message, the computer program product comprising:

one or more computer-readable tangible storage devices and program instructions stored on at least one of the one or more storage devices, the program instructions comprising:

program instructions to identify an electronic message that has not yet been transmitted for delivery to any addressee;

program instructions to identify one or more addressees of the electronic message;

program instructions to identify any informational messages associated with each of the identified one or more addressees, wherein the informational messages are predefined by the one or more addressees and stored in a centralized database, and the informational messages comprise at least one of hyperlinks, command buttons, or programmable elements for execution by a user to replace, prior to the computer system transmitting the electronic message for delivery to any addressee, an addressee of the electronic message with an alternative addressee or replace all occurrences of an addressee's name in the electronic message with a name of an alternative addressee; and program instructions to display the identified informational messages prior to transmitting the electronic message for delivery to any addressee.

10. The computer program product of claim 9, wherein the program instructions to identify any informational messages associated with each of the identified one or more addressees comprise program instructions, stored on at least one of the one or more storage devices, to:

retrieve from a database one or more informational messages associated with each of the one or more addressees, wherein the one or more informational messages are predefined by the one or more addressees, and wherein the one or more informational messages are each associated with one or more text strings; and identify the one or more informational messages by determining that the electronic message contains the one or more text strings associated with each of the one or more informational messages.

11. The computer program product of claim 10, wherein the program instructions to display the identified informational messages further comprise program instructions, stored on at least one of the one or more storage devices, to:

visually distinguish from the remainder of the electronic message the one or more text strings determined to be contained within the electronic message.

12. The computer program product of claim 9, wherein the electronic message is an e-mail, instant message, cellular network text message, social media message, or blog post.

* * * * *